US008701084B1

(12) United States Patent
MacDonald

(10) Patent No.: US 8,701,084 B1
(45) Date of Patent: Apr. 15, 2014

(54) PREVIEW OF AUTO-FIX CHANGES TO SOFTWARE CODE

(75) Inventor: Jared MacDonald, Somerville, MA (US)

(73) Assignee: The MathWorks, Inc., Natick, MA (US)

( * ) Notice: Subject to any disclaimer, the term of this patent is extended or adjusted under 35 U.S.C. 154(b) by 1879 days.

(21) Appl. No.: 11/647,588

(22) Filed: Dec. 29, 2006

(51) Int. Cl.
*G06F 9/44* (2006.01)

(52) U.S. Cl.
USPC .......................................................... 717/113

(58) Field of Classification Search
USPC ................. 717/100, 109, 110, 127, 140, 113; 707/999.001, 999.103; 704/2; 434/322; 715/84, 731, 866
See application file for complete search history.

(56) References Cited

U.S. PATENT DOCUMENTS

| | | | | |
|---|---|---|---|---|
| RE38,270 | E * | 10/2003 | Nakajima | 713/1 |
| 6,698,013 | B1 * | 2/2004 | Bertero et al. | 717/127 |
| 6,804,682 | B1 * | 10/2004 | Kemper et al. | 1/1 |
| 6,807,548 | B1 * | 10/2004 | Kemper | 707/999.103 |
| 7,669,188 | B2 * | 2/2010 | Nickell et al. | 717/126 |
| 7,958,486 | B2 * | 6/2011 | Tsyganskiy et al. | 717/105 |
| 2005/0114833 | A1 * | 5/2005 | Bates et al. | 717/110 |
| 2008/0052684 | A1 * | 2/2008 | Bowdidge et al. | 717/136 |

OTHER PUBLICATIONS

Raphael Enns, "Refacotring in Eclipse", 2004, Tutorial, Department of Computer Science, University of Manitoba, Winnipeg, Manitoba, Canada, retrieved from: http://web.archive.org/web/20040807092514/http://www.cs.umanitoba.ca/~eclipse/13-Refactoring.pdf.*
Stefan Slinger, "Code Smell Detection in Eclipse", Mar. 2005, Thesis, Delft University of Technology.*
Chris Aniszczyk, "Using GEF with EMF", Jun. 2005, IBM, Eclipse Corner Article.*
Drozda et al. "Refactoring Tools and Complementary Techniques", Mar. 2006, IEEE International Conference on Computer Systems and Applications.*
Binkley et al.,"Tool-Supported Refactoring of Existing Object-Oriented Code into Aspects", Sep. 2006, IEEE Transactions on Software Engineering, vol. 32, No. 9.*
Donald Roberts "Practical Analysis for Refactoring", 1999, Thesis, Computer Science Department, University of Illinois at Urbana-Champaign.*

* cited by examiner

*Primary Examiner* — Tuan A Vu

(74) *Attorney, Agent, or Firm* — Venable LLP; Michael A. Sartori; Todd R. Farnsworth

(57) ABSTRACT

A computer-implemented method for automatically modifying software code in an integrated development environment, includes the steps of: analyzing software code, wherein the software code is stored in at least one file on a computer readable medium; displaying to a user at least one indication that the software code can be automatically modified; receiving a selection from the user to automatically modify the software code; modifying the software code without modifying the at least one file; and displaying the modified software code to the user.

27 Claims, 6 Drawing Sheets

```
powers_of_two.m
30
31  % Compute the first n powers of two
32  function x = powers_of_two(n)
33      for i = 1:n
34          ▓▓▓▓▓▓▓         206
35      end
36  end
37
38
39
40
```

— 202

M-Lint Suggestion

Variable 'x' on line 34 appears to be growing inside a loop. Consider preallocating the array.

Learn more about growing and pre-allocating arrays

204

208

Preview

```
powers_of_two.m branch 1  (testing suggestion about pre-allocating x)
30
31  % Compute the first n powers of two
32  function x = powers_of_two(n)
33      x = zeros(1,10);
34      for i = 1:n
35          x(i) = i^2;       306
36      end
37  end
38
39
40
```

308

302

312

M-Lint Suggestion

The variable 'x' has been preallocated. You may run the code, change how the variable is pre-allocated, then decide whether to accept or reject this change.

Learn more about growing and pre-allocating arrays

304

310

Accept    Revert

PREVIEW OF AUTO-FIX CHANGES TO SOFTWARE CODE

BACKGROUND

Software code development applications, including stand-alone development applications and integrated development environments (IDE) may have code analyzers that provide the ability to indicate to the user (e.g. the developer) when an error is present in the written software code and to correct the error automatically when the user so chooses. Code analyzers may also suggest ways to improve code efficiency or readability.

If the user is uncertain as to how such a change will affect the software, he/she may conventionally save the changed code as a new file or project. The user may then have to compile and/or run the software. If the changes are not desired, then the user must revert back to the previous, and separate, older version. This process may be cumbersome for the user, especially when a program is long and/or complex and/or when there are multiple potential sets of changes that could be made.

SUMMARY

In one embodiment, a computer-implemented method for automatically modifying software code in an integrated development environment may include the steps of: analyzing software code, where the software code is stored in at least one file on a computer readable medium; displaying to a user at least one indication that the software code can be automatically modified; receiving a selection from the user to automatically modify the software code; modifying the software code without modifying the file; and displaying the modified software code to the user.

In another embodiment, a computer-readable medium may include software, which when executed by a computer system causes the computer system to perform operations for automatically modifying software code in a development environment, the operations may include: analyzing software code, where the software code is stored in at least one file on a computer readable medium; displaying to a user at least one indication that the software code can be automatically modified; receiving a selection from the user to automatically modify the software code; modifying the software code without modifying the file; and displaying the modified software code to the user.

In another embodiment, a system for automatically modifying software code in an integrated development environment for writing and compiling software code may include: a code analyzer to analyze software code, wherein the software code includes at least one file stored on a computer readable medium; preview means for indicating to a user that the software code can be automatically modified, according to a result of the code analyzer; user selection means for receiving a user selection of an automatic modification to be made; editing means for modifying the software code automatically without modifying the at least one file; and means for displaying the modified software code to the use.

In another embodiment, a system for developing software code may include: an integrated development environment, which may include: a graphical user interface to display at least one of code or suggested modifications to the user and to receive user input; a code analyzer to analyze software code, wherein the software code includes at least one file stored on a computer readable medium; preview means for indicating to a user that the software code can be automatically modified, according to a result of the code analyzer; user selection means for receiving a user selection of an automatic modification to be made; and editing means for modifying the software code automatically without modifying the at least one file.

BRIEF DESCRIPTION OF THE DRAWINGS

The foregoing and other features of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

FIG. 2 depicts a graphical user interface (GUI) showing a suggestion for code modification;

FIG. 3 depicts a GUI showing a branch of modified code;

DEFINITIONS

Figure 1:
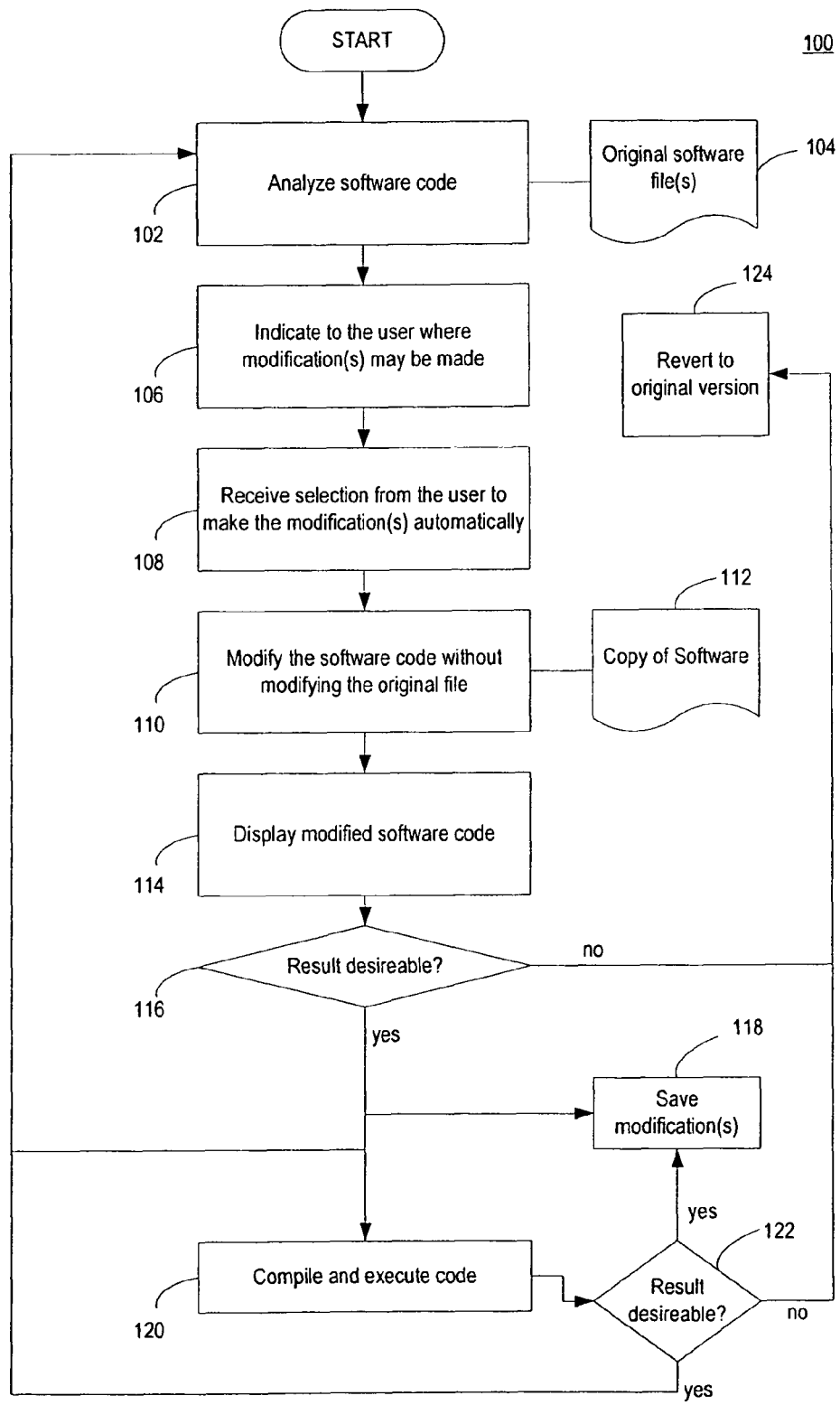
FIG. 1 depicts a flowchart of a process of previewing and trying code changes.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; a tablet personal computer (PC); application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC) or a multiprocessor system-on-chip (MPSoC); an optical computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EXEMPLARY EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. The examples and embodiments described herein are non-limiting examples.

An exemplary embodiment may be implemented in a technical computing environment (e.g., MATLAB® software by The MathWorks, Inc. of Natick, Mass.; Comsol Script by Comsol, Inc., Octave (a free high level programming language available, e.g., from www.gnu.org), Scilab (an open source numerical computation platform, available, e.g., from www. Scilab.org); MathsScript, e.g. as used in LabVIEW by National Instruments of Austin, Tex.; and, Mathematica by Wolfram Research, Inc. of Champaign, Ill.). A technical computing environment may include an environment that can run commands compatible with the aforementioned, or equivalent, products.

An exemplary embodiment may be implemented with an integrated development environment (IDE) (e.g., the M-Lint tool component of MATLAB® software by The MathWorks, Inc. of Natick, Mass.; Visual Studio and Visual Basic by Microsoft, Inc. of Redmond, Wash.; VisualH by IBM, Inc. of Armonk, N.Y.), or in a stand-alone software development application. An IDE often includes a source code editor, a compiler and/or interpreter, build-automation tools, and usually a debugger. IDEs are generally window-based, although some may be command-line based. An IDE may be formed from an application that can process scripts (e.g., a text-based editor such as Emacs may run scripts to implement IDE functionality). An exemplary embodiment may be implemented with computer aided design (CAD) environments or applications, e.g. AutoDesk and AutoCad from Autodesk, Inc. of San Rafael, Calif.

FIG. 1 is a flowchart 100 of a process for previewing code changes according to exemplary embodiments. In block 102, the software code in development is analyzed, prior to compilation, by an analysis module of an IDE. The software code may be stored on a computer readable medium as one or more software files 104. The analysis module may be, for example, a part of the IDE, or an add-on to the IDE, or a stand-alone application. Analysis may include, for example, checking for logic errors, syntax errors, typographical errors, unused variables, inefficient code (e.g., unused code or partially used code), duplicated code, or other issues in the code that may cause the code not to compile, to run inefficiently, or be difficult to maintain or read. Analysis may also be directed to refactoring the code. Refactoring code generally means to change the code while preserving its behavior and without modifying the feature set of the code. Refactoring may correct code having design, test, or other structural flaws. Refactoring may change the code without changing the code's extensional properties.

In block 106, a preview module indicates to the user that modifications may be made to one or more segments of the software code. For example, FIG. 2 shows an exemplary editor graphical user interface (GUI) window 200 with a listing of the code 202. The preview module may display a suggestion 204 about a portion of the code, highlighted in block 206. Other methods of indicating a suggestion to the user may also be contemplated, such as, for example, a callout balloon, or a separate window listing suggestions by code line number.

In block 108, the preview module receives a user selection of which modifications to make to the software code, for example, by receiving a selection of the "Preview" button 208.

In block 110, the modifications may be made to the software code by the code editor, without changing the corresponding original software file(s) 104. In an exemplary embodiment, a copy 112 of the software code 104 may be made. The copy 112 may be stored in random access memory (RAM) or other volatile memory, or on a non-volatile computer readable medium.

FIG. 3 illustrates an exemplary embodiment of the editor GUI 200 from FIG. 2 with revised code 302. The revised code 302 may be presented in the same GUI window as the previous code, or a new GUI window may open to show the revised code 302. The editor GUI indicates that a branch of the original file is being edited, and shows a description of the branch at section 308. The change to the code may be indicated, for example, by square 312 to the left of the new line

306. The user may work with the branched version of the code, for example, compiling and running the code, marking changes in performance, and/or creating sub-branches of the branch version (not shown).

Once satisfied, the user can decide whether to accept, e.g. with button 314, or reject the change, e.g. with button 310. Some modifications may result in changes propagating to multiple locations and/or files of the software code.

The modified code may then be displayed to the user in bock 114.

If the modifications are desirable, in block 116, the modifications optionally may be saved, in block 118. Alternatively, or in addition, the user may then choose to compile and execute the modified code in block 120. Compiling and executing in block 120 also leaves the original software files 104 unmodified. If the resulting code is desirable in block 122, the modifications to the original code may be saved in block 118. The user may, for example, be able to execute the code and compare performance benchmarks against other versions. Saving the modifications in block 118 may replace the original file(s) 104 with updated file(s). Alternatively, the modified code may be saved to one or more new files, or saved as a new version in a document management system having version control. Otherwise, the changes may be discarded, reverting to the original version in block 124.

Exemplary embodiments allow the technique to work recursively. For example, after block 116 or block 122, modified code may be analyzed starting at block 102, with further suggestions for modifications. The user may continue to follow a recursive branch path of analysis and modification until a desired result is reached, or until a particular branch is abandoned. If a particular branch is abandoned, the modifications may revert to the previous branch point.

Figure 4:
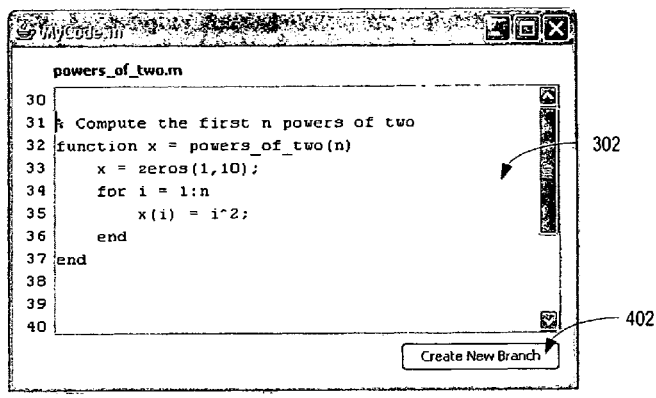
FIG. 4 depicts a GUI showing an ability to create a new branch of code.

In an exemplary embodiment, multiple versions of modifications may be presented to the user simultaneously. A user may want to examine several versions of the code, or the preview module of the IDE may present several possible modifications to a block of code. When the user opts to create a new branch, for example, by selecting button 402 in FIG. 4, a new virtual version of the file may be created. The user may then experiment with the change, committing or reverting at will. Conventional source control systems may provide some of the same functionality, but the conventional process requires more work on the part of the user. Conventional source control systems may require that a user create a branch, checkout the source code, point the IDE to the new branch, and manage multiple copies of files. Exemplary embodiments may incorporate those operations into the IDE itself and relieve the user of having to manage the multiple branches.

For example, the modifications may be presented to the user in a tree-like fashion, with a branch for each separate code change, as described below and illustrated in FIG. 6. Instead of having to select changes in a linear fashion, the possible modifications may be presented to the user in parallel, with a version for each branch path in the tree. The user may then compare the different versions, for example, visually, or by compiling and executing with benchmarks, and select the preferred version.

Figure 5:
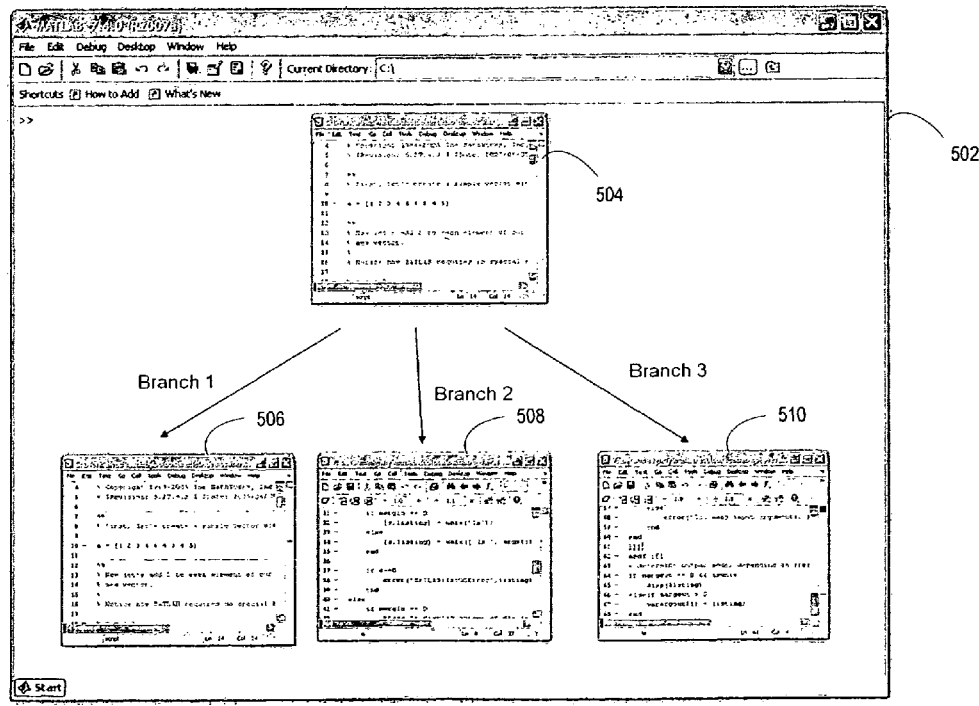
FIG. 5 depicts a GUI of an IDE having multiple branches of code modifications.

FIG. 5 illustrates a GUI 502 for the IDE. The branch point, or "original" version of the code, which may itself be a branch from the code, is shown in window 504. In this instance, the user has created three separate branches 506, 508 and 510, each of which may be made active, run, and compared, while leaving the stored copy of the code unchanged.

Figure 6:
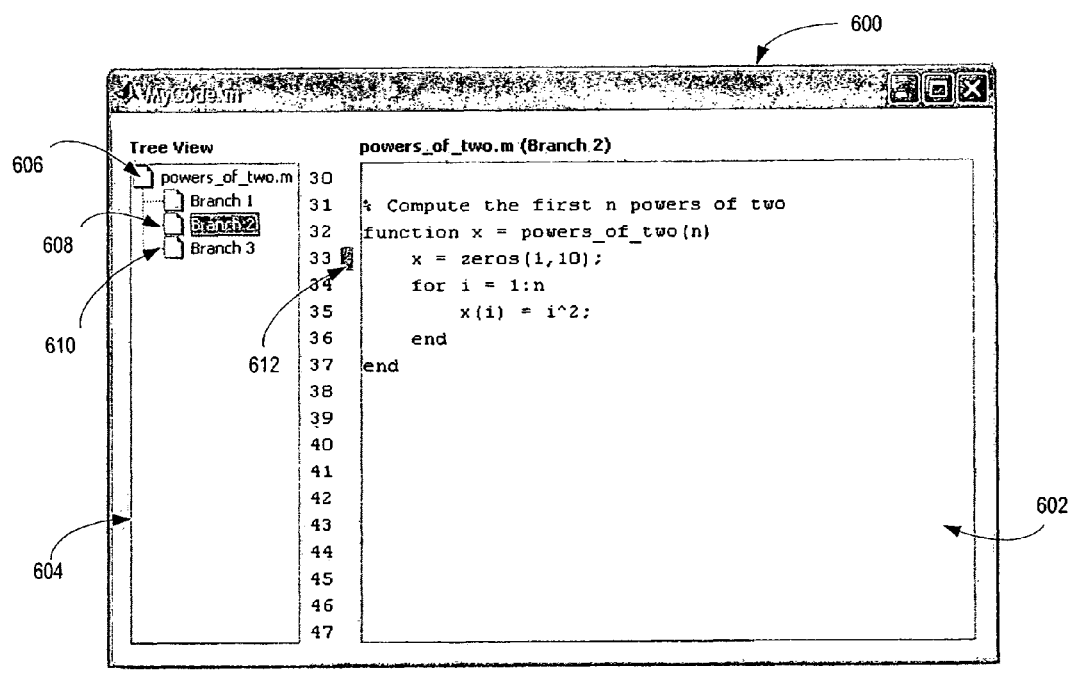
FIG. 6 depicts a GUI of an IDE showing multiple branches as a tree structure.

FIG. 6 illustrates an exemplary GUI 600 having a tree view pane 604 and a code editing pane 602. Tree view pane 604 shows a branch point, or source, of software code 606. Branch point 606 may be, for example, a file, a project, a functional component of a project, etc. Tree view pane 604 further shows three separate branches, e.g. 608 and 610, of branch point 606. In the view in FIG. 6, Branch 2 (608) is selected, and the code in branch 2 is shown in code editing pane 602. The change from the branch point 606 is indicated by square 612.

Figure 7:
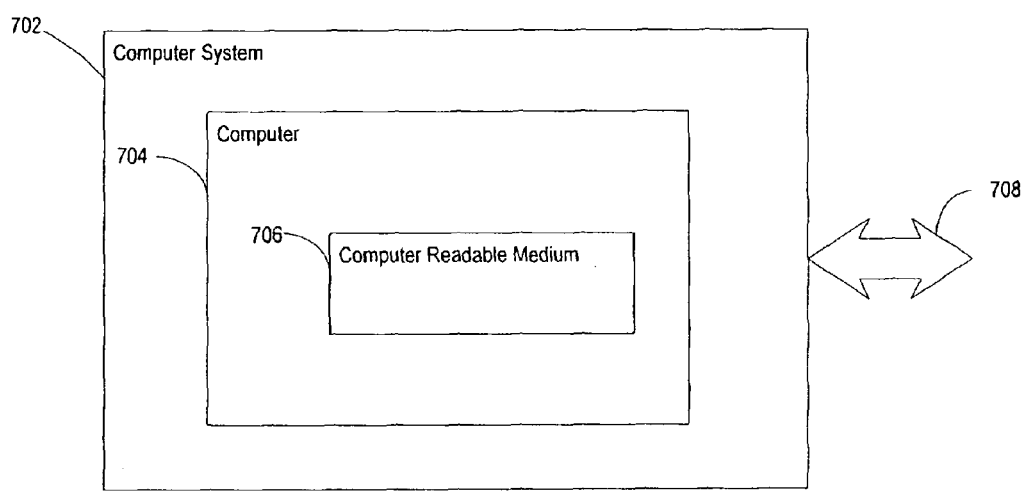
FIG. 7 depicts a computer system for use with exemplary embodiments.

FIG. 7 depicts a computer system for use with exemplary embodiments. The computer system 702 includes a computer 704 for implementing the invention. The computer 704 includes a computer-readable medium 706 embodying software for implementing the invention and/or software to operate the computer 704 in accordance with the invention. As an option, the computer system 702 includes a connection to a network 708. With this option, the computer 702 is able to send and receive information (e.g., software, data, documents) from other computer systems via the network 708.

Figure 8:
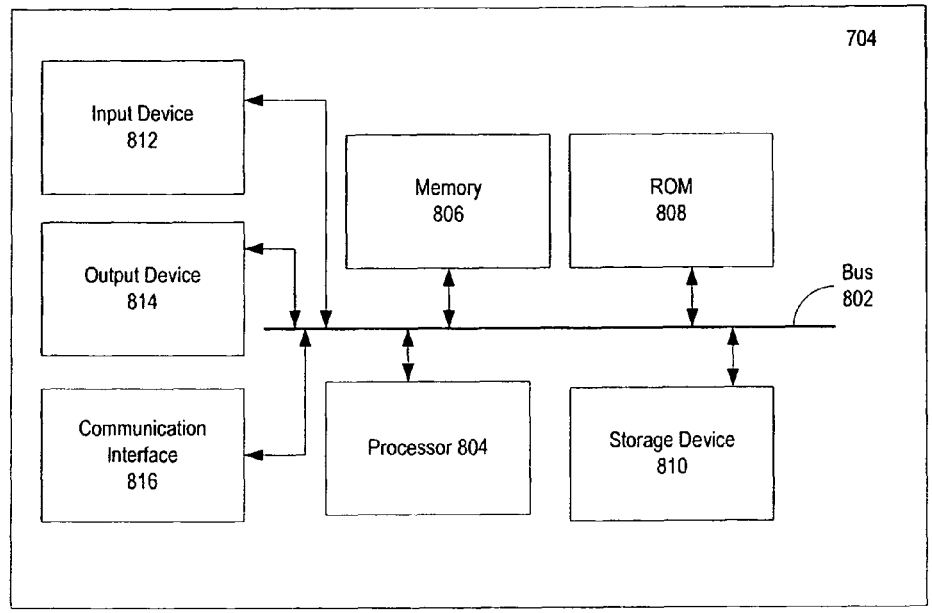
FIG. 8 depicts an exemplary architecture for implementing a computer.

FIG. 8 illustrates an exemplary architecture for implementing computer 704 of FIG. 7. As illustrated in FIG. 8, computer 704 may include a bus 802, a processor 804, a memory 806, a read only memory (ROM) 808, a storage device 810, an input device 812, an output device 814, and a communication interface 816.

Bus 802 may include one or more interconnects that permit communication among the components of computer 704. Processor 804 may include any type of processor, microprocessor, or processing logic that may interpret and execute instructions (e.g., a field programmable gate array (FPGA)). Processor 804 may include a single device (e.g., a single core) and/or a group of devices (e.g., multi-core). Memory 806 may include a random access memory (RAM) or another type of dynamic storage device that may store information and instructions for execution by processor 804. Memory 806 may also be used to store temporary variables or other intermediate information during execution of instructions by processor 804.

ROM 808 may include a ROM device and/or another type of static storage device that may store static information and instructions for processor 804. Storage device 810 may include a magnetic disk and/or optical disk and its corresponding drive for storing information and/or instructions. Storage device 810 may include a single storage device or multiple storage devices, such as multiple storage devices operating in parallel. Moreover, storage device 810 may reside locally on computer 704 and/or may be remote with respect to computer 704 and connected thereto via network 708 and/or another type of connection, such as a dedicated link or channel.

Input device 812 may include any mechanism or combination of mechanisms that permit an operator to input information to computer 704, such as a keyboard, a mouse, a touch sensitive display device, a microphone, a pen-based pointing device, and/or a biometric input device, such as a voice recognition device and/or a finger print scanning device. Output device 814 may include any mechanism or combination of mechanisms that outputs information to the operator, including a display, a printer, a speaker, etc.

Communication interface 816 may include any transceiver-like mechanism that enables computer 604 to communicate with other devices and/or systems. For example, communication interface 816 may include one or more interfaces, such as a first interface coupled to network 608 and/or a second interface coupled to another device (not shown). Alternatively, communication interface 816 may include other mechanisms (e.g., a wireless interface) for communicating via a network, such as a wireless network. In one implementation, communication interface 816 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 704 may perform certain functions in response to processor 804 executing software instructions contained in a computer-readable medium, such as memory 806. A computer-readable medium may be defined as one or more memory devices. In alternative embodiments, hardwired circuitry may be used in place of or in combination with software instructions to implement features consistent with principles of the invention. Thus, implementations consistent with principles of the invention are not limited to any specific combination of hardware circuitry and software.

Figure 9:
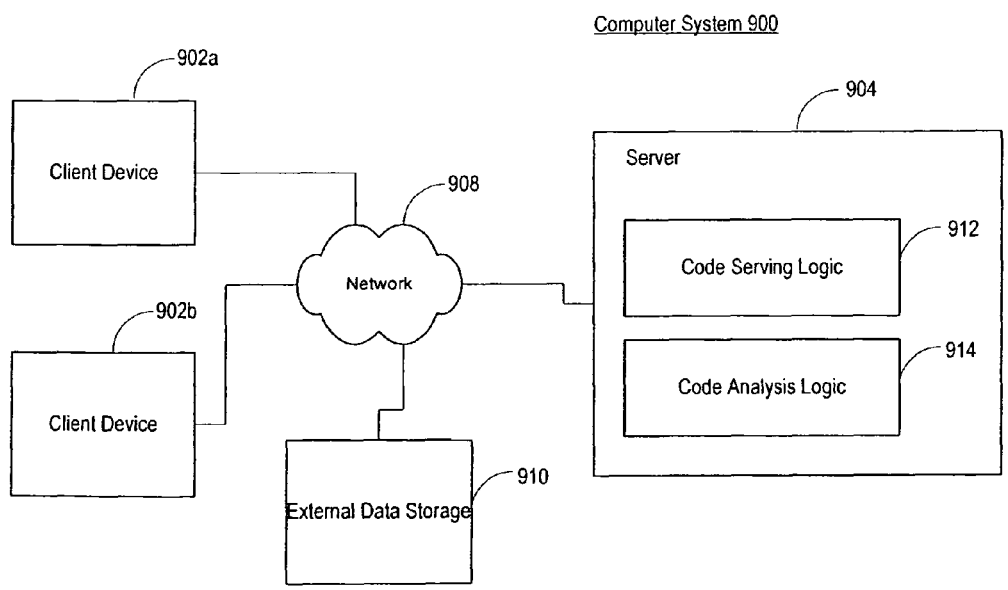
FIG. 9 depicts a networked computer system for use with exemplary embodiments.

FIG. 9 depicts a networked computer system 900 for use with exemplary embodiments. Computer system 900 may include one or more client devices 902a, 902b. Client devices 902 may be computers or computer systems. Client devices 902 may be in communication with a server 904 over a network 908. Server 904 may provide software code data to client devices 902, for example, data stored on external storage 910. Server 904 may further include code serving logic 912 and code analysis logic 914.

Exemplary embodiments may be embodied in many different ways as a software component. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

Exemplary embodiments may exist as part of a text-based technical computing environment, such as, e.g. MATLAB® of The MathWorks, Inc. of Natick, Mass., USA. The techniques described herein may be embodied in functional components of such a technical computing environment, such as, for example, in a function, a model, a class, or other program element. Exemplary embodiments may exist as part of a technical computing environment that uses a graphical programming language, such as "G" used with LabVIEW by National Instruments of Austin, Tex., and/or uses graphical modeling, such as, e.g. SIMULINK® and STATEFLOW®, by The MathWorks, Inc. of Natick, Mass., USA. The techniques described herein may be embodied in functional components of such a technical computing environment, such as, for example, in a simulation block, or a simulation toolset.

The examples and embodiments described herein are non-limiting examples.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method for automatically modifying software code in an integrated development environment, the method comprising:
retrieving, by at least one processor, software code stored in at least one file on a non-transitory computer readable medium, the at least one file representing a branch point;
analyzing, by the at least one processor, the retrieved software code;
displaying, by the at least one processor, to a user an indication that the software code can be automatically modified;
receiving, by the at least one processor, a selection from the user to automatically modify the software code;
performing a first modification, by the at least one processor, of the software code without modifying the at least one file, the first modification representing a first branch, the first branch branching off the branch point;
displaying, by the at least one processor, to the user a second indication that the first modified software code can be automatically further modified;
receiving, by the at least one processor, a second selection from the user to automatically further modify the first modified software code;
performing a second modification, by the at least one processor, of the first modified software code according to a plurality of alternate automatic modifications;
generating, by the at least one processor, a plurality of further modified software code corresponding to the alternate automatic modifications, the further modified software code generated without modifying the at least one file;
representing, by the at least one processor, the plurality of further modified software code as a second branch, the second branch branching off the first branch;
performing a third modification, by the at least one processor, of the software code without modifying the at least one file, the third modification representing a third branch, the third branch branching off the branch point;
displaying, by the at least one processor, multiple versions of the software code, the display comprising:
    displaying the multiple versions of the software code as a plurality of branches in a tree structure, the plurality of branches including the first branch, the second branch, and the third branch,
    displaying the first branch as a branch originating from the branch point,
    displaying the second branch as a sub-branch originating from the first branch, and
    displaying the third branch as another branch originating from the branch point;
reverting, by the at least one processor, from the plurality of further modified software code to the software code based on an indication that the reverting should occur, the indication received on behalf of the user; and
removing, by the at least one processor, the second branch from the display as a result of the indication that the reverting should occur.

2. The method of claim 1, further comprising:
compiling and executing the third branch without modifying the first branch, the second branch, and the at least one file.

3. The method of claim 1, further comprising:
wherein displaying to the user the indication comprises displaying to the user one or more of a plurality of alternate automatic modifications that can be made to the software code;
wherein receiving the selection from the user comprises receiving a selection from the user to perform the one or more of the plurality of alternate automatic modifications on the software code;
wherein performing the first modification of the software code comprises performing the one or more of the plurality of alternate automatic modifications on the software code without modifying the at least one file, whereby alternate versions of the software code are created; and wherein displaying multiple versions of the software code comprises displaying the one or more of the plurality of alternate automatic modifications to the user.

4. The method of claim 3, further comprising:
compiling and executing each of the alternate versions of the software code without modifying the at least one file.

5. The method of claim 1, wherein performing a first modification of the software code includes at least one of:
correcting errors in the software code;
improving memory usage of compiled software produced from the software code;
improving readability of the software code;
improving maintainability of the software code; or
refactoring the software code.

6. The method of claim 1, further comprising:
displaying to the user a reason for the first modification.

7. The method of claim 1, wherein analyzing software code occurs prior to the software code being compiled.

8. A method for automatically modifying software code in an integrated development environment, comprising:
providing downloadable software to a computer system, which when executed by the computer system causes the computer system to perform operations comprising the method of claim 1.

9. A method for automatically modifying software code in an integrated development environment, comprising:
downloading software to a computer system, which when executed by the computer system causes the computer system to perform operations comprising the method of claim 1.

10. The method of claim 1, wherein:
displaying to a user includes displaying in a graphical user interface; and
receiving a selection includes receiving the selection with the graphical user interface.

11. The method of claim 1, further comprising:
providing the method as a functional component of at least one of: a text-based technical computing environment or a technical computing environment having graphical models.

12. The method of claim 11, wherein providing the method as a functional component of a technical computing environment having graphical models includes graphical models using a graphical programming language.

13. The method of claim 1, further comprising:
providing the user a plurality of benchmark results associated with compiling and executing the third branch without modifying the first branch, the second branch, and the at least one file.

14. The method of claim 1, wherein software code for the first branch, the second branch, the third branch, and the branch point are displayed simultaneously to the user.

15. At least one non-transitory computer-readable medium comprising instructions, which when executed by a computer system causes the computer system to perform operations for automatically modifying software code in a development environment, the at least one non-transitory computer readable medium comprising one or more instructions for:
retrieving software code stored in at least one file on a non-transitory computer readable medium, the at least one file representing a branch point;
analyzing the retrieved software code;
displaying to a user an indication that the software code can be automatically modified;
receiving a selection from the user to automatically modify the software code;
performing a first modification of the software code without modifying the at least one file, the first modification representing a first branch, the first branch branching off the branch point;
displaying to the user a second indication that the first modified software code can be automatically further modified;
receiving a second selection from the user to automatically further modify the first modified software code;
performing a second modification of the first modified software code according to a plurality of alternate automatic modifications;
generating a plurality of further modified software code corresponding to the alternate automatic modifications, the further modified software code generated without modifying the at least one file;
representing the plurality of further modified software code as a second branch, the second branch branching off of the first branch;
performing a third modification of the software code without modifying the at least one file, the third modification representing a third branch, the third branch branching off the branch point;
displaying multiple versions of the software code, the display comprising:
displaying the multiple versions of the software code as a plurality of branches in a tree structure, the plurality of branches including the first branch, the second branch, and the third branch,
displaying the first branch as a branch originating from the branch point,
displaying the second branch as a sub-branch originating from the first branch, and
displaying the third branch as another branch originating from the branch point;
reverting from the plurality of further modified software code to the software code based on an indication that the reverting should occur, the indication received on behalf of the user; and
removing the second branch from the display as a result of the indication that the reverting should occur.

16. The at least one non-transitory computer-readable medium of claim 15 further comprising:
one or more instructions for compiling and executing the third branch without modifying the first branch, the second branch, and the at least one file.

17. The at least one non-transitory computer-readable medium of claim 15,
wherein performing a first modification of the software code includes at least one of:
correcting errors in the software code;
improving memory usage of compiled software to be produced from the software code;
improving readability of the software code;
improving maintainability of the software code; and/or
refactoring the software code.

18. The at least one non-transitory computer-readable medium of claim 17, further comprising:
one or more instructions for compiling and executing each of the alternate versions of the software code without modifying the at least one file.

19. The at least one non-transitory computer-readable medium of claim 15, wherein displaying to the user the indication comprises displaying to the user one or more of the plurality of alternate automatic modifications that can be made to the software code;

wherein receiving the selection from the user comprises receiving a selection from the user to perform the one or more of the plurality of alternate automatic modifications on the software code;

wherein performing the first modification of the software code comprises performing the one or more of the plurality of alternate automatic modifications on the software code without modifying the at least one file, whereby alternate versions of the software code are created; and wherein displaying multiple versions of the software code comprises displaying the one or more of the plurality of alternate automatic modifications to the user.

20. The at least one non-transitory computer-readable medium of claim 15, wherein analyzing software code occurs prior to the software code being compiled.

21. The at least one non-transitory computer-readable medium of claim 15, wherein:
displaying to a user includes displaying in a graphical user interface; and
receiving a selection includes receiving the selection with the graphical user interface.

22. The at least one non-transitory computer-readable medium according to claim 15, wherein the software is a functional component of at least one of: a text-based technical computing environment or a technical computing environment having graphical models.

23. At least one non-transitory computer-readable medium comprising instructions, which when executed by a computer system causes the computer system to perform operations for automatically modifying software code in a development environment, the at least one non-transitory computer readable medium comprising one or more instructions for:
retrieving software code stored in at least one file on a non-transitory computer readable medium;
a code analyzer to analyze the retrieved software code;
a previewer to indicate to a user that the software code can be automatically modified, according to a result of the code analyzer;
a receiver to receive a user selection of an automatic modification to be made;
an editor to perform a first modification of the software code automatically without modifying the at least one file, the first modification representing a first branch, the first branch branching off the branch point;
the previewer to display to the user a second indication that the first modified software code can be automatically further modified;
the receiver to receive a second selection from the user to automatically further modify the first modified software code;
the editor to perform a second modification of the first modified software code according to a plurality of alternate automatic modifications;
the editor to generate a plurality of further modified software code corresponding to the alternate automatic modifications, the further modified software code generated without modifying the at least one file;
the editor to represent the plurality of further modified software code as a second branch, the second branch branching off of the first branch;
the editor to perform a third modification of the software code without modifying the at least one file, the third modification representing a third branch, the third branch branching off the branch point;
a displayer to display multiple versions of the software code the display comprising:
displaying the multiple versions of the software code as a plurality of branches in a tree structure, the plurality of branches including the first branch, the second branch, and the third branch,
displaying the first branch as a branch originating from the branch point,
displaying the second branch as a sub-branch originating from the first branch, and
displaying the third branch as another branch originating from the branch point;
a reverter to revert from the plurality of further modified software code to the software code based on an indication that the reverting should occur, the indication received on behalf of the user; and
the displayer to remove the second branch from the display as a result of the indication that the reverting should occur.

24. The at least one non-transitory computer readable medium of claim 23, further comprising:
one or more instructions for compiling and executing the third branch without modifying the first branch, the second branch, and the at least one file.

25. The at least one non-transitory computer readable medium of claim 23, further comprising:
one or more recursive instructions for allowing the code analyzer, the previewer, the editor and the displayer to operate on the results of the editor.

26. A system for developing software code, comprising:
an integrated development environment operative on a computing device, the integrated development environment including:
a graphical user interface to display at least one of code or suggested modifications to the user and to receive user input;
a code analyzer to retrieve software code stored in at least one file on a non-transitory computer readable medium and to analyze the retrieved software code;
a previewer to indicate to a user that the software code can be automatically modified, according to a result of the code analyzer;
a user selection receiver to receive a user selection of an automatic modification to be made;
an editor to perform a first modification of the software code automatically without modifying the at least one file, the first modification representing a first branch, the first branch branching off the branch point;
a displayer to display to the user a second indication that the first modified software code can be automatically further modified;
the user selection receiver to receive a second selection from the user to automatically further modify the first modified software code;
the editor to perform a second modification of the first modified software code according to a plurality of alternate automatic modifications;
the editor to generate a plurality of further modified software code corresponding to the alternate automatic modifications, the further modified software code generated without modifying the at least one file;
the editor to represent the plurality of further modified software code as a second branch, the second branch branching off the first branch;

the editor to perform a third modification of the software code without modifying the at least one file, the third modification representing a third branch, the third branch branching off the branch point;

the displayer to display multiple versions of the software code the display comprising:

displaying the multiple versions of the software code as a plurality of branches in a tree structure, the plurality of branches including the first branch, the second branch, and the third branch, displaying the first branch as a branch originating from the branch point, displaying the second branch as a sub-branch originating from the first branch, and displaying the third branch as another branch originating from the branch point;

a reverter to revert from the plurality of further modified software code to the software code based on an indication that the reverting should occur, the indication received on behalf of the user; and the displayer to remove the second branch from the display as a result of the indication that the reverting should occur.

27. The system of claim 26, wherein the computing device is at least one of: a multi-core computing device, a distributed computing device, a parallel processing computing device, or a general purpose on graphics processing unit computing device.

* * * * *